Patented Nov. 10, 1925.

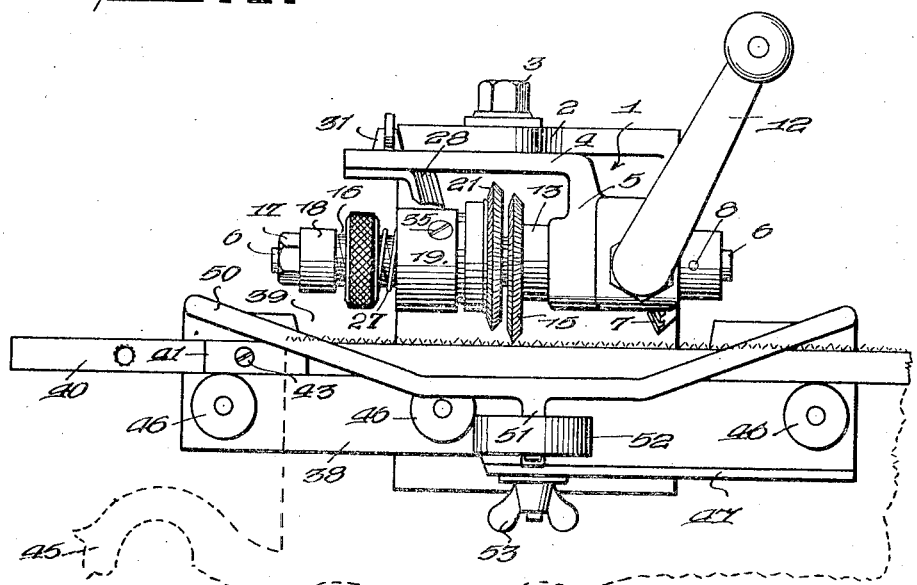

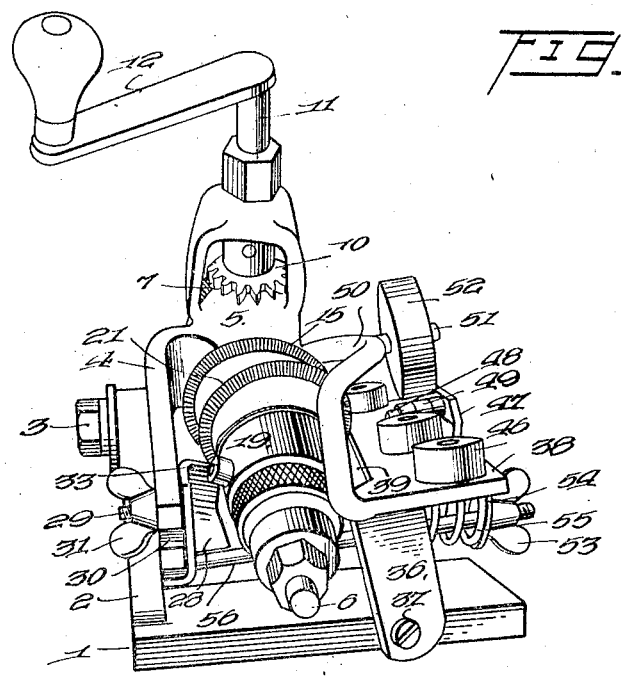
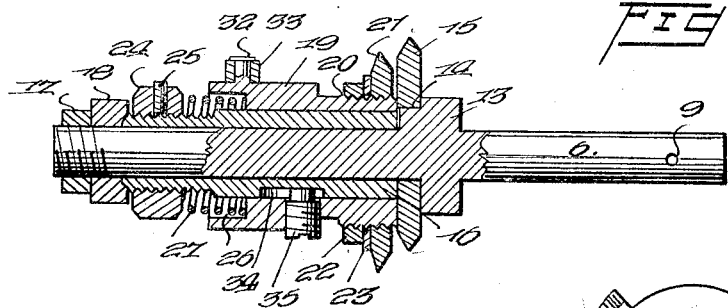
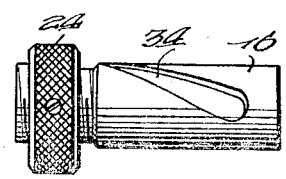
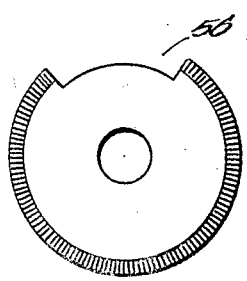

1,561,231

UNITED STATES PATENT OFFICE.

ALBERT J. HATZ, OF PRESCOTT, ARIZONA.

SAW-SHARPENING MACHINE.

Application filed March 6, 1925. Serial No. 13,477.

*To all whom it may concern:*

Be it known that I, ALBERT J. HATZ, a citizen of the United States, residing at Prescott, in the county of Yavapai and State of Arizona, have invented new and useful Improvements in Saw-Sharpening Machines, of which the following is a specification.

This invention relates to saw sharpening machines and comprises all improvements over the prior art, which are disclosed in this application. The primary object is to produce a machine which is readily adjustable to sharpen various kinds of saws in a thoroughly satisfactory manner.

The above and other objects which will hereinafter appear, are attained by improvements embodying new and useful features as disclosed in this application.

To enable others skilled in the art to so fully comprehend the essential features of the improvements that they may embody the same by the modifications contemplated by the improvements disclosed in this application, drawings illustrating a preferred form have been annexed as a part of this disclosure.

Fig. 1 is a top plan view of the machine with the fixed cutter acting on a saw tooth and showing the handle end of a saw in broken line outline.

Fig. 2 is a top plan view of the machine with the feeding cutter at the end of its feeding movement in contact with a saw tooth, and showing the cutting end of a saw in broken line outline.

Fig. 3 is a side perspective view of the machine with the feed bar omitted.

Fig. 4 is a longitudinal sectional view through the parts mounted on the cutter shaft.

Fig. 5 is a side view of the bushing showing the spiral cam slot.

Fig. 6 is a side view of a modified form of cutter.

The machine comprises a base 1 from which rises a support 2, and through a hole in which passes a cap screw 3 threadedly engaging in arm 4 of cutter head frame 5. Thus, as the cutter head frame is supported only by screw 3, the frame can be adjusted to any necessary angle in a vertical plane by swinging the frame on the screw 3 as a pivot and then tightening the screw 3 to retain the frame in the desired adjusted position.

Extending through frame 5 is a shaft 6 having bevel gear 7 secured thereto by a pin 8 engaging in hole 9 of the shaft. Meshing with gear 7 is another bevel gear 10 secured to shaft 11 operated by crank 12.

Shaft 6 is provided with enlargement 13 which with bevel gear 7 serves to prevent substantial longitudinal movement of the shaft in frame 5. Adjacent to enlargement 13 is formed an eccentric portion 14 on which is mounted the fixed cutter 15. Cutter 15 is locked against rotation relative to its mounting 14 by making the cutter 15 a little thicker than the width of eccentric mounting 14, and by forcing bushing 16 firmly against cutter 15 by means of nut 17 threaded on shaft 6 and engaging against washer 18 which latter engages against bushing 16.

Slidably mounted on bushing 16 is a hub 19 provided with an eccentric threaded portion 20 on which is threaded the member 21 which may be used solely as a feeding member by having the outer angled surfaces smooth, or said angled surfaces may be provided with cutting teeth similar to the cutting teeth on cutter 15, in which case member 21 acts both as a cutter and feeding member as hereinafter explained. Member 21 is threaded on the hub the distance desired and is then secured in adjusted position by threaded locking ring 22 and washer 23. Stop ring 24 is threaded on one end of the bushing and locked in adjusted position by screw 25. The hub 19 is recessed at 26 and a coil spring 27 engages between the locking ring and the end wall of the recess of the hub 19 to normally maintain sliding cutter 21 adjacent fixed cutter 15.

A cam 28 has a threaded stem 29 passing through a slot 30 in arm 4 and engaged by thumb nut 31. Thus by tightening nut 31 any necessary adjustment of cam 28 can be made. Mounted on hub 19 is a pin 32 carrying roller 33. In the bushing 16 is a spiral cam slot 34 into which extends the end of a screw 35 carried by hub 19.

A saw carriage 36 is pivoted to base 1 by a pivot 37 and a similar pivot at the opposite side of the base. The bed 38 of the saw carriage is cut away at 39 to clear the cutters. A feed bar 40 has clamping pieces 41, 42 held by screws 43, 44 against a saw 45 indicated in broken line outline. The feed bar 40 slides along bed 38 against rollers 46. Rising from bed 38 is a flange 47 carrying a pin 48 on which are mounted rollers 49 on which the saw blade slides. Joined to the opposite ends of bed 38 is a bar 50 having a pivot 51 carrying roller 52 which is slightly spaced from rollers 49 to hold the saw blade down on rollers 49.

In operation, the cutter 21 is adjusted to be spaced the proper distance from cutter 15 to suit the size of teeth on the saw to be sharpened. To sharpen a rip saw, the cutter head is swung to bring shaft 6 parallel with the feed bar, and the screw 3 tightened to hold the cutter head in adjusted position. The cam 28 can be adjusted to feed the distance of one tooth and locked in adjusted position by tightening nut 31. Stop 24 is set to prevent the saw going past the set position of cam 28. The rip saw is now placed between rollers 49 and 52 and clamped to feed bar 40 by clamps 41, 42. Thumb nut 53 is now tightened on bolt 56 against washer 54 and spring 55 to swing the carriage on its pivots to bring the saw teeth into position for sharpening The degree of pressure of the teeth against the cutters being determined by the amount spring 55 is compressed by nut 53.

Crank 12 is now turned clockwise and through gears 10 and 7 rotates shaft 6. As the cutters 15 and 21 have concentric holes mounted on opposed eccentrics, first one cutter and then the other cutter sharpens a tooth. While cutter 21 is sharpening a tooth, roller 33 on the hub 19 engages cam 28 and slides the cutter to the left as shown in Fig. 2 to feed the saw. To assist this feeding action, the spiral cam slot 34 of bushing 16 engages the end of screw 35 of the hub 19. When the roller 33 passes beyond cam 28, as it is about to do in Fig. 2, the spring 27 forces the hub 19 carrying cutter 21 back to its original position. At this time, of course, the cutter 21, owing to its eccentric mounting is out of contact with the saw tooth, and the cutter 15 is in contact with a saw tooth. Thus by continuing to turn crank 12 the sharpening and feeding action continues.

In the case of other hand saws than rip saws, a fleam must be given to the teeth. This is accomplished by setting shaft 6 upwardly at angle to feed bar 40, and by adjusting cam 28 to feed the distance of two teeth. Each alternate tooth is thereby sharpened with the proper fleam to the teeth. Then the shaft 6 is set downwardly at an angle to feed bar 40, and the remaining group of alternate teeth are sharpened with an opposite fleam as is well understood by those in the art.

The cam 28 may be taken off and the cutters run through each tooth several times and the saw fed by hand, if desired.

This machine is controlled nearly the same as filing by hand as the teeth are always in sight and the cutters can be made to take more off a large tooth by aiding the pressure of spring 55 by pressure of the hand against the saw carriage, and less can be taken off a small tooth by pulling on the saw carriage to lighten the effect of spring 55.

Instead of mounting the cutters eccentrically, they may be made as shown in Fig. 6 with a cut out portion 56. In use the cut out portions of the fixed and sliding cutters would be arranged on opposite sides of the shaft 6 to alternately clear the saw teeth in a similar manner to eccentric cutters 15 and 21.

Without further elaboration, this disclosure will so fully reveal the gist of the improvements that others can, by applying current knowledge, readily vary these improvements without omitting certain features, that from the standpoint of the prior art, fairly constitute essential characteristics of the generic and specific aspects of these improvements, and therefore such variations are intended to be comprehended within the meaning and range of equivalency of the following claims.

I claim:

1. In a saw filing machine, means for holding a saw to be sharpened and fed longitudinally of itself, a rotatable shaft extending in the general longitudinal direction of the saw, a rotary cutter fixedly secured to said shaft, a rotary member adapted to be rotated by said shaft, and means to reciprocate said rotary member longitudinally of said shaft.

2. The device set forth in claim 1 in which the rotary cutter and saw are yieldingly urged relatively toward each other.

3. The device set forth in claim 1 in which the rotary cutter and rotary member are eccentrically mounted on the shaft.

4. The device set forth in claim 1 in which the rotary cutter and rotary member can be adjusted relatively to the saw to rotate in planes at right angles or acute angles to the plane of the saw.

5. The device set forth in claim 1 in which the means to reciprocate said rotary member comprises, cam means for moving the rotary member in the direction of feed, and spring means for moving the rotary member in the reverse direction.

6. The device set forth in claim 1 in which the rotary member is adjustable relatively to the rotary cutter longitudinally of the shaft.

7. The device set forth in claim 1 in which the rotary member is a cutter.

8. In a saw filing machine, means for holding a saw to be sharpened and fed longitudinally of itself, a cutter head adjustably mounted on a pivot transverse of, and substantially parallel to, the plane of the saw, a rotatable shaft mounted in the cutter head and extending in the general longitudinal direction of the saw, a rotary cutter fixedly secured to said shaft, a rotary member adapted to be rotated by said shaft, and means to reciprocate said rotary member longitudinally of said shaft.

9. The device set forth in claim 8 in which the rotary member is a cutter.

ALBERT J. HATZ.